(12) United States Patent
Hu et al.

(10) Patent No.: US 10,807,639 B2
(45) Date of Patent: Oct. 20, 2020

(54) TRAILER WHEEL TARGETLESS TRAILER ANGLE DETECTION

(71) Applicant: Ford Global Technologies, LLC, Dearborn, MI (US)

(72) Inventors: Zheng Hu, Farmington Hills, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 16/031,417

(22) Filed: Jul. 10, 2018

(65) Prior Publication Data

US 2018/0319437 A1 Nov. 8, 2018

Related U.S. Application Data

(63) Continuation of application No. 15/233,458, filed on Aug. 10, 2016, now Pat. No. 10,046,800.

(51) Int. Cl.
*G06K 9/00* (2006.01)
*B62D 13/06* (2006.01)
(Continued)

(52) U.S. Cl.
CPC .............. *B62D 13/06* (2013.01); *B60R 11/04* (2013.01); *B62D 15/027* (2013.01);
(Continued)

(58) Field of Classification Search
CPC .. B62D 13/06; B62D 15/027; B62D 15/0285; B60R 2300/105; B60R 2300/808;
(Continued)

(56) References Cited

U.S. PATENT DOCUMENTS 3,542,390 A 11/1970 Fikes et al.
3,605,088 A 9/1971 Savelli
(Continued)

FOREIGN PATENT DOCUMENTS

CN 102582686 B 9/2013
CN 106250893 A 12/2016
(Continued)

OTHER PUBLICATIONS

Novak, Domen; Dovzan, Dejan; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.
(Continued)

*Primary Examiner* — Li Liu
(74) *Attorney, Agent, or Firm* — Raymond Coppiellie; Price Heneveld LLP

(57) ABSTRACT

A backup assist system for a vehicle and trailer combination includes a steering system, a camera generating an image of the trailer, and a controller. The controller receives the image and identifying a wheel therein, determines a trailer hitch angle using at least one of an aspect ratio or location of the wheel in the image, and implements a trailer backup mode including using the estimated hitch angle in view of a kinematic model of the vehicle and trailer combination to control the steering system in reversing the trailer along a user-selected path.

20 Claims, 10 Drawing Sheets

(51) Int. Cl.
*G06K 9/46* (2006.01)
*B60R 11/04* (2006.01)
*B62D 15/02* (2006.01)

(52) U.S. Cl.
CPC ..... *G06K 9/00791* (2013.01); *G06K 9/00805* (2013.01); *G06K 9/4609* (2013.01)

(58) Field of Classification Search
CPC .......... B60R 2300/806; G06K 9/00791; G06T 2207/30252; G06T 2207/10016; G06T 7/246; G06T 7/60; G06T 7/73
See application file for complete search history.

(56) References Cited

U.S. PATENT DOCUMENTS

| | | |
|---|---|---|
| 3,787,077 A | 1/1974 | Sanders |
| 3,833,928 A | 9/1974 | Gavit et al. |
| 3,860,257 A | 1/1975 | Mesley |
| 4,040,006 A | 8/1977 | Kimmel |
| 4,042,132 A | 8/1977 | Bohman et al. |
| 4,122,390 A | 10/1978 | Kollitz et al. |
| 4,212,483 A | 7/1980 | Howard |
| 4,366,966 A | 1/1983 | Ratsko et al. |
| 4,727,419 A | 2/1988 | Yamada et al. |
| 4,735,432 A | 4/1988 | Brown |
| 4,752,080 A | 6/1988 | Rogers |
| 4,778,060 A | 10/1988 | Wessner, Jr. |
| 4,848,449 A | 7/1989 | Martinet et al. |
| 4,852,901 A | 8/1989 | Beasley et al. |
| 4,943,080 A | 7/1990 | Reimer |
| 5,001,639 A | 3/1991 | Breen |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,152,544 A | 10/1992 | Dierker, Jr. et al. |
| 5,191,328 A | 3/1993 | Nelson |
| 5,244,226 A | 9/1993 | Bergh |
| 5,246,242 A | 9/1993 | Penzotti |
| 5,247,442 A | 9/1993 | Kendall |
| 5,282,641 A | 2/1994 | McLaughlin |
| 5,289,892 A | 3/1994 | Notsu |
| 5,290,057 A | 3/1994 | Pellerito |
| 5,455,557 A | 10/1995 | Noll et al. |
| 5,521,633 A | 5/1996 | Nakajima et al. |
| 5,523,947 A | 6/1996 | Breen |
| 5,541,778 A | 7/1996 | DeFlorio |
| 5,558,350 A | 9/1996 | Kimbrough et al. |
| 5,559,696 A | 9/1996 | Borenstein |
| 5,579,228 A | 11/1996 | Kimbrough et al. |
| 5,631,656 A | 5/1997 | Hartman et al. |
| 5,650,764 A | 7/1997 | McCullough |
| 5,690,347 A | 11/1997 | Juergens et al. |
| 5,719,713 A | 2/1998 | Brown |
| 5,747,683 A | 5/1998 | Gerum et al. |
| 5,821,852 A | 10/1998 | Fairchild |
| 5,980,048 A | 11/1999 | Rannells, Jr. et al. |
| 6,041,582 A | 3/2000 | Tiede et al. |
| 6,042,196 A | 3/2000 | Nakamura et al. |
| 6,124,709 A | 9/2000 | Allwine |
| 6,151,175 A | 11/2000 | Osha |
| 6,198,992 B1 | 3/2001 | Winslow |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boros et al. |
| 6,268,800 B1 | 7/2001 | Howard |
| 6,292,094 B1 | 9/2001 | Deng et al. |
| 6,301,548 B1 | 10/2001 | Gerum |
| 6,351,698 B1 | 2/2002 | Kubota et al. |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,539,288 B2 | 3/2003 | Ishida et al. |
| 6,568,093 B2 | 5/2003 | Kogiso et al. |
| 6,577,952 B2 | 6/2003 | Geier et al. |
| 6,668,225 B2 | 12/2003 | Oh et al. |
| 6,704,653 B2 | 3/2004 | Kuriya et al. |
| 6,712,378 B1 | 3/2004 | Austin |
| 6,801,125 B1 | 10/2004 | McGregor et al. |
| 6,806,809 B2 | 10/2004 | Lee et al. |
| 6,820,888 B1 | 11/2004 | Griffin |
| 6,838,979 B2 | 1/2005 | Deng et al. |
| 6,854,557 B1 | 2/2005 | Deng et al. |
| 6,857,494 B2 | 2/2005 | Kobayashi et al. |
| 6,879,240 B2 | 4/2005 | Kruse |
| 6,956,468 B2 | 10/2005 | Lee et al. |
| 6,959,970 B2 | 11/2005 | Tseng |
| 6,999,856 B2 | 2/2006 | Lee et al. |
| 7,005,974 B2 | 2/2006 | McMahon et al. |
| 7,006,127 B2 | 2/2006 | Mizusawa et al. |
| 7,008,088 B2 | 3/2006 | Pisciotti |
| 7,028,804 B2 | 4/2006 | Eki et al. |
| 7,032,705 B2 | 4/2006 | Zheng et al. |
| 7,046,127 B2 | 5/2006 | Boddy |
| 7,058,493 B2 | 6/2006 | Inagaki |
| 7,089,101 B2 | 8/2006 | Fischer et al. |
| 7,154,385 B2 | 12/2006 | Lee et al. |
| 7,159,890 B2 | 1/2007 | Craig et al. |
| 7,167,785 B2 | 1/2007 | Lohberg et al. |
| 7,170,285 B2 | 1/2007 | Spratte |
| 7,171,330 B2 | 1/2007 | Kruse et al. |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,239,958 B2 | 7/2007 | Grougan et al. |
| 7,269,489 B2 | 9/2007 | Deng et al. |
| 7,272,481 B2 | 9/2007 | Einig et al. |
| 7,295,907 B2 | 11/2007 | Lu et al. |
| 7,401,871 B2 | 7/2008 | Lu et al. |
| 7,405,557 B2 | 7/2008 | Spratte et al. |
| 7,413,266 B2 | 8/2008 | Lenz et al. |
| 7,425,889 B2 | 9/2008 | Widmann et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,504,995 B2 | 3/2009 | Lawrence et al. |
| 7,532,109 B2 | 5/2009 | Takahama et al. |
| 7,540,523 B2 | 6/2009 | Russell et al. |
| 7,548,155 B2 | 6/2009 | Schutt et al. |
| 7,568,716 B2 | 8/2009 | Dietz |
| 7,623,952 B2 | 11/2009 | Unruh et al. |
| 7,648,153 B2 | 1/2010 | Metternich et al. |
| 7,690,737 B2 | 4/2010 | Lu |
| 7,715,953 B2 | 5/2010 | Shepard |
| 7,731,302 B2 | 6/2010 | Tandy, Jr. et al. |
| 7,793,965 B2 | 9/2010 | Padula |
| 7,798,263 B2 | 9/2010 | Tandy, Jr. et al. |
| 7,878,545 B2 | 2/2011 | Rhymer et al. |
| 7,904,222 B2 | 3/2011 | Lee et al. |
| 7,905,507 B2 | 3/2011 | Perri |
| 7,950,751 B2 | 5/2011 | Offerle et al. |
| 7,953,536 B2 | 5/2011 | Katrak |
| 7,974,444 B2 | 7/2011 | Hongo |
| 8,010,252 B2 | 8/2011 | Getman et al. |
| 8,010,253 B2 | 8/2011 | Lundquist |
| 8,036,792 B2 | 10/2011 | Dechamp |
| 8,038,166 B1 | 10/2011 | Piesinger |
| 8,044,779 B2 | 10/2011 | Hahn et al. |
| 8,073,594 B2 | 12/2011 | Lee et al. |
| 8,157,284 B1 | 4/2012 | McGhie et al. |
| 8,165,770 B2 | 4/2012 | Getman et al. |
| 8,167,444 B2 | 5/2012 | Lee et al. |
| 8,170,726 B2 | 5/2012 | Chen et al. |
| 8,174,576 B2 | 5/2012 | Akatsuka et al. |
| 8,180,543 B2 | 5/2012 | Futamura et al. |
| 8,190,364 B2 | 5/2012 | Rekow |
| 8,191,915 B2 | 6/2012 | Freese, et al. |
| 8,192,036 B2 | 6/2012 | Lee et al. |

(56) References Cited

U.S. PATENT DOCUMENTS

| | | |
|---|---|---|
| 8,215,436 B2 | 7/2012 | DeGrave et al. |
| 8,223,204 B2 | 7/2012 | Hahn |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,308,182 B2 | 11/2012 | Ortmann et al. |
| 8,326,504 B2 | 12/2012 | Wu et al. |
| 8,342,560 B2 | 1/2013 | Albers et al. |
| 8,380,390 B2 | 2/2013 | Sy et al. |
| 8,380,416 B2 | 2/2013 | Offerle et al. |
| 8,393,632 B2 | 3/2013 | Vortmeyer et al. |
| 8,401,744 B2 | 3/2013 | Chiocco |
| 8,427,288 B2 | 4/2013 | Schofield et al. |
| 8,469,125 B2 | 6/2013 | Yu et al. |
| 8,498,757 B2 | 7/2013 | Bowden et al. |
| 8,504,243 B2 | 8/2013 | Kageyama |
| 8,547,401 B2 | 10/2013 | Mallinson et al. |
| 8,548,680 B2 | 10/2013 | Ryerson et al. |
| 8,548,683 B2 | 10/2013 | Cebon et al. |
| 8,571,777 B2 | 10/2013 | Greene |
| 8,576,115 B2 | 11/2013 | Basten |
| 8,626,382 B2 | 1/2014 | Obradovich |
| 8,675,953 B1 | 3/2014 | Elwell et al. |
| 8,755,984 B2 | 6/2014 | Rupp et al. |
| 8,768,535 B2 | 7/2014 | Kossira et al. |
| 8,807,261 B2 | 8/2014 | Subrt et al. |
| 8,811,698 B2 | 8/2014 | Kono et al. |
| 8,825,328 B2 | 9/2014 | Rupp et al. |
| 8,833,789 B2 | 9/2014 | Anderson |
| 8,886,400 B2 | 11/2014 | Kossira et al. |
| 8,888,120 B2 | 11/2014 | Trevino |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 8,972,109 B2 | 3/2015 | Lavoie et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,102,271 B2 | 8/2015 | Trombley et al. |
| 9,108,598 B2 | 8/2015 | Headley |
| 9,114,832 B2 | 8/2015 | Wang et al. |
| 9,120,358 B2 | 9/2015 | Motts et al. |
| 9,120,359 B2 | 9/2015 | Chiu et al. |
| 9,132,856 B2 | 9/2015 | Shepard |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,187,124 B2 | 11/2015 | Trombley et al. |
| 9,227,474 B2 | 1/2016 | Liu |
| 9,238,483 B2 | 1/2016 | Hafner et al. |
| 9,248,858 B2 | 2/2016 | Lavoie et al. |
| 9,296,422 B2 | 3/2016 | Lavoie |
| 9,315,212 B1 | 4/2016 | Kyrtswosw et al. |
| 9,321,483 B2 | 4/2016 | Headley |
| 9,335,162 B2 | 5/2016 | Kyrtsos et al. |
| 9,340,228 B2 | 5/2016 | Xu et al. |
| 9,352,777 B2 | 5/2016 | Lavoie et al. |
| 9,393,996 B2 | 7/2016 | Goswami et al. |
| 9,428,188 B2 | 8/2016 | Schwindt et al. |
| 9,434,414 B2 | 9/2016 | Lavoie |
| 9,437,055 B2 | 9/2016 | Kuehnle et al. |
| 9,500,497 B2 | 11/2016 | Lavoie |
| 9,610,974 B2 | 4/2017 | Herzog et al. |
| 9,616,923 B2 | 4/2017 | Lavoie |
| 9,623,904 B2 | 4/2017 | Lavoie et al. |
| 9,676,377 B2 | 6/2017 | Hafner et al. |
| 9,731,568 B2 | 8/2017 | Wuergler et al. |
| 9,798,953 B2 | 10/2017 | Hu |
| 9,802,542 B2 | 10/2017 | Lu et al. |
| 9,827,818 B2 | 11/2017 | Hu et al. |
| 9,836,060 B2 | 12/2017 | Ghneim et al. |
| 9,840,278 B2 | 12/2017 | Lavoie et al. |
| 10,046,800 B2 | 8/2018 | Hu et al. |
| 2001/0024333 A1 | 9/2001 | Rost |
| 2001/0037164 A1 | 11/2001 | Heckner |
| 2002/0128764 A1 | 9/2002 | Hecker et al. |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2004/0130441 A1 | 7/2004 | Lee et al. |
| 2004/0215374 A1* | 10/2004 | Shepard .................. B60D 1/58 701/1 |
| 2004/0222881 A1 | 11/2004 | Deng et al. |
| 2005/0000738 A1 | 1/2005 | Gehring et al. |
| 2005/0074143 A1 | 4/2005 | Kawai |
| 2005/0128059 A1 | 6/2005 | Vause |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0244579 A1 | 11/2006 | Raab |
| 2007/0027581 A1 | 2/2007 | Bauer et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0216134 A1* | 9/2007 | Padula ................ B62D 13/025 280/443 |
| 2007/0285808 A1 | 12/2007 | Beale |
| 2008/0147277 A1 | 6/2008 | Lu et al. |
| 2008/0231701 A1 | 9/2008 | Greenwood et al. |
| 2008/0312792 A1 | 12/2008 | Dechamp |
| 2009/0005932 A1 | 1/2009 | Lee et al. |
| 2009/0079828 A1 | 3/2009 | Lee et al. |
| 2009/0085775 A1 | 4/2009 | Otsuka et al. |
| 2009/0093928 A1 | 4/2009 | Getman et al. |
| 2009/0198425 A1 | 8/2009 | Englert |
| 2009/0228182 A1 | 9/2009 | Waldbauer et al. |
| 2009/0248346 A1 | 10/2009 | Fennel et al. |
| 2009/0280859 A1 | 11/2009 | Bergh |
| 2009/0300701 A1 | 12/2009 | Karaoguz et al. |
| 2009/0306861 A1 | 12/2009 | Schumann et al. |
| 2010/0063702 A1 | 3/2010 | Sabelstrom et al. |
| 2010/0171828 A1 | 7/2010 | Ishii |
| 2010/0272370 A1 | 10/2010 | Schilling et al. |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0087398 A1 | 4/2011 | Lu et al. |
| 2011/0112721 A1 | 5/2011 | Wang et al. |
| 2011/0125457 A1 | 5/2011 | Lee et al. |
| 2011/0160956 A1 | 6/2011 | Chung et al. |
| 2011/0181457 A1 | 7/2011 | Basten |
| 2011/0257860 A1 | 10/2011 | Getman et al. |
| 2012/0041658 A1 | 2/2012 | Turner |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0185131 A1 | 7/2012 | Headley |
| 2012/0200706 A1 | 8/2012 | Greenwood et al. |
| 2012/0221168 A1 | 8/2012 | Zeng et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0310594 A1 | 12/2012 | Watanabe |
| 2013/0006472 A1 | 1/2013 | McClain et al. |
| 2013/0024064 A1 | 1/2013 | Shepard |
| 2013/0027195 A1 | 1/2013 | Van Wiemeersch et al. |

(56) References Cited

U.S. PATENT DOCUMENTS

| | | |
|---|---|---|
| 2013/0082453 A1 | 4/2013 | Padula |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0250114 A1 | 9/2013 | Lu |
| 2013/0261843 A1 | 10/2013 | Kossira et al. |
| 2013/0268160 A1 | 10/2013 | Trombley et al. |
| 2013/0321347 A1 | 12/2013 | Kim |
| 2014/0005918 A1 | 1/2014 | Qiang |
| 2014/0012465 A1 | 1/2014 | Shank et al. |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0088824 A1 | 3/2014 | Ishimoto |
| 2014/0160276 A1 | 6/2014 | Pliefke et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1* | 9/2014 | Aich ................. H04N 7/181 348/113 |
| 2014/0267689 A1 | 9/2014 | Lavoie |
| 2014/0277941 A1 | 9/2014 | Chiu et al. |
| 2014/0277942 A1 | 9/2014 | Kyrtsos et al. |
| 2014/0288777 A1* | 9/2014 | Rupp ................. B62D 13/06 701/41 |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0002670 A1 | 1/2015 | Bajpai |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0105975 A1 | 4/2015 | Dunn |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0197278 A1 | 7/2015 | Boos et al. |
| 2015/0203156 A1 | 7/2015 | Hafner et al. |
| 2015/0210254 A1 | 7/2015 | Pieronek et al. |
| 2015/0210317 A1 | 7/2015 | Hafner et al. |
| 2015/0217693 A1* | 8/2015 | Pliefke ................. B60R 1/00 348/118 |
| 2015/0269444 A1 | 9/2015 | Lameyre et al. |
| 2015/0344010 A1* | 12/2015 | Kurtovic ............ B60T 8/1708 701/70 |
| 2016/0001705 A1 | 1/2016 | Greenwood et al. |
| 2016/0009288 A1 | 1/2016 | Yu |
| 2016/0039456 A1 | 2/2016 | Lavoie et al. |
| 2016/0059780 A1 | 3/2016 | Lavoie |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0129939 A1 | 5/2016 | Singh et al. |
| 2016/0152263 A1 | 6/2016 | Singh et al. |
| 2016/0153778 A1 | 6/2016 | Singh et al. |
| 2016/0229452 A1 | 8/2016 | Lavoie et al. |
| 2016/0280267 A1 | 9/2016 | Lavoie et al. |
| 2017/0073005 A1 | 3/2017 | Ghneim et al. |
| 2017/0101130 A1 | 4/2017 | Lavoie |
| 2017/0106796 A1 | 4/2017 | Lavoie et al. |
| 2017/0174130 A1 | 6/2017 | Hu et al. |
| 2017/0177949 A1 | 6/2017 | Hu et al. |
| 2017/0267284 A1* | 9/2017 | Shepard ................. B62D 13/06 |
| 2017/0297619 A1 | 10/2017 | Lavoie et al. |
| 2017/0297620 A1 | 10/2017 | Lavoie et al. |
| 2017/0313351 A1 | 11/2017 | Lavoie |
| 2018/0251153 A1 | 9/2018 | Li et al. |
| 2018/0253608 A1 | 9/2018 | Diessner et al. |

FOREIGN PATENT DOCUMENTS

| | | |
|---|---|---|
| DE | 3923676 A1 | 1/1991 |
| DE | 3931518 A1 | 4/1991 |
| DE | 9208595 U1 | 8/1992 |
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 | 4/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 102012005707 A1 | 10/2012 |
| DE | 202012010517 U | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| DE | 102013000198 A1 | 7/2014 |
| EP | 0418653 A1 | 3/1991 |
| EP | 433858 A2 | 6/1991 |
| EP | 1361543 A2 | 11/2003 |
| EP | 1593552 B1 | 3/2007 |
| EP | 1593552 B2 | 3/2007 |
| EP | 1810913 A1 | 7/2007 |
| EP | 2388180 A2 | 11/2011 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2803944 A2 | 11/2014 |

(56) References Cited

FOREIGN PATENT DOCUMENTS

| | | |
|---|---|---|
| FR | 2515379 A1 | 4/1983 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 615491 A | 3/1986 |
| JP | 6385568 U | 6/1988 |
| JP | 01095980 A | 4/1989 |
| JP | 01095981 A | 4/1989 |
| JP | 09267762 A | 10/1997 |
| JP | 09328078 A | 12/1997 |
| JP | 10001063 A | 1/1998 |
| JP | 11124051 A | 5/1999 |
| JP | 11278319 A | 10/1999 |
| JP | 2002012172 A | 1/2002 |
| JP | 2002068032 A | 3/2002 |
| JP | 2003034261 A | 2/2003 |
| JP | 2003148938 A | 5/2003 |
| JP | 3716722 B2 | 11/2005 |
| JP | 2008027138 A1 | 2/2008 |
| JP | 2012105158 A | 5/2012 |
| JP | 2012166647 A | 9/2012 |
| JP | 2014002056 A | 1/2014 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |
| WO | 2014019730 A1 | 2/2014 |
| WO | 2014037500 A1 | 3/2014 |
| WO | 2014070047 A1 | 5/2014 |
| WO | 2014092611 A1 | 6/2014 |
| WO | 2014123575 A1 | 8/2014 |
| WO | 2015074027 A1 | 5/2015 |
| WO | 2015187467 A1 | 12/2015 |
| WO | 2017123880 A1 | 7/2017 |

OTHER PUBLICATIONS

"Ford Super Duty: Truck Technologies", Brochure, Sep. 2011, 2 pages.
Kristopher Bunker, "2012 Guide to Towing", Trailer Life, 2012, 38 pages.
A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.
L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.
M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.
F.W. Kienhöfer; D. Cebon, "An Investigation of ABS Strategies for Articulated Vehicles", Cambridge University, Engineering Department, United Kingdom, date unknown, 13 pages.
C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pages.
Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.
Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 6 pages.
A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.
Zare, A. Sharafi; M. Kamyad, A.V., "A New Approach in Intelligent Trailer Parking", IEEE, 2010 2nd International Mechanical and Electrical Technology (ICMET), Sep. 2010, 1 page.
Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.
Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.
Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.
Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.
P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.
Dieter Zöbel, David Polock, Philipp Wojke, "Steering Assistance for Backing Up Articulated Vehicles", Systemics, Cybernetics and Informatics; vol. 1, No. 5, date unknown, 6 pages.
J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.
Jesus Morales, Anthony Mandow, Jorge L Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.
Cedric Pradalier and Kane Usher, "Experiments in Autonomous Reversing of a Tractor-Trailer System", 6th International Conference on Field and Service Robotics, inria-00195700, Version 1, Dec. 2007, 10 pages.
Andri Riid, Alar Leibak, Ennu Rüstern, "Fuzzy Backing Control of Truck and Two Trailers", Tallinn University of Technology; Tallinn, Estonia, date unknown, 6 pages.
Jane McGrath, "How to Avoid Jackknifing", A Discovery Company, date unknown, 3 pages.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.
Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.
A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.

(56) References Cited

OTHER PUBLICATIONS

Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.

Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.

Lee Yong H.; Weiwen Deng; Chin Yuen-Kwok Steve; McKay Neil, "Feasibility Study for a Vehicle-Trailer Backing Up Control", Refdoc.fr, SAE Transactions, vol. 113, No. 6, 2004, 1 page.

A.M.C. Odhams; R.L. Roebuck; B.A. Jujnovich; D. Cebon, "Active Steering of a Tractor—Semi-Trailer" Proceedings of the Institution of Mechanical Engineers, Part D: Journal of Automobile Engineering, SAGE Journals, vol. 225, No. 7, Jul. 2011, 1 page.

Haviland, G S, "Automatic Brake Control for Trucks—What Good Is It?", TRID, Society of Automotive Engineers, Sep. 1968, 1 page.

William E. Travis; David W. Hodo; David M. Bevly; John Y. Hung, "UGV Trailer Position Estimation Using a Dynamic Base RTK System", American Institute of Aeronautics and Astronautics, date unknown, 12 pages.

"VSE Electronic Trailer Steering", ETS for Trailers, version 2009, VSE Trailer Systems B.V., 2009, 28 pages.

"Telematics Past, Present, and Future," Automotive Service Association, www.ASAshop.org, May 2008, 20 pages.

"Fully Automatic Trailer Tow Hitch With LIN Bus," https://webista.bmw.com/webista/show?id=1860575499&lang=engb&print=1, date unknown, 5 page.

"VBOX Yaw Rate Sensor With Integral Accelerometers," Racelogic, www.racelogic.co.uk, date unknown, 2 pages.

P.D.C.R Jayarathna; J.V Wijayakulasooriya; S.R Kodituwakku, "Fuzzy Logic and Neural Network Control Systems for Backing up a Truck and a Trailer", International Journal of Latest Trends in Computing, vol. 2, No. 3, Sep. 2011, 8 pages.

Olof Enqvist, "AFS-Assisted Trailer Reversing," Institutionen för systemteknik Deartment of Electrical Engineering, Jan. 27, 2006, 57 pages.

Sh. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

Olof Enqvist, "AFS-Assisted Trailer Reversing," Institutionen för systemteknik Deartment of Electrical Engineering, Jan. 27, 2006, pp. 1-57.

Tofel, Kevin C., "How to measure anything with a camera and software", Feb. 6, 2007, 6 pgs. [Retrieved from http://giaom.com/2007/06/how_to_measure/ on Sep. 4, 2014].

Sonnenberg, Jan, "Service and User Interface Transfer from Nomadic Devices to Car Infotainment Systems", Second International Conference on Automotive User Interfaces and Interactive Vehicular Applications (Automotive UI), Nov. 11-12, 2010, pp. 162-165.

Ratajczak, Robert; Grajek, Tomasz; Wegner, Krzysztof; Klimaszewski, Krzusztof; Kurc, Maciej; Domański, Marek, "Vehicle Dimensions Estimation Scheme Using AAM on Stereoscopic Video", date unknown, pp. 4321-4325.

"Measure and Calculate Distance", Help Forum, Google Maps, 1 pg. [Retrieved from https://support.google.com/maps/answer/1628031?hl=en on Sep. 4, 2014].

De Brito, Jr., Jailson A.; De Campos, Luis Edmundo Prado; "Automatic Vehicle Classification Using Learning-based Computer Vision and Fuzzy Logic", Departmento de Ciencia da Computacao, Instituto de Matematics, Universidade Federal da Bahia, date unknown, 4 pgs.

Dlagnekov, Louka; Belongie, Serge, "Recognizing Cars", Department of Computer Science and Engineering, University of California, San Diego, CA, date unknown, pp. 1-8.

\* cited by examiner

TRAILER WHEEL TARGETLESS TRAILER ANGLE DETECTION

CROSS-REFERENCE TO RELATED APPLICATION

This application is a continuation of U.S. patent application Ser. No. 15/233,458, filed Aug. 10, 2016, entitled "TRAILER WHEEL TARGETLESS TRAILER ANGLE DETECTION", the entire disclosure of which is hereby incorporated by reference.

FIELD OF THE INVENTION

The disclosure made herein relates generally to steering assist technologies in vehicles and, more particularly, to a length estimation for a trailer using an image including a trailer wheel.

BACKGROUND OF THE INVENTION

Reversing a vehicle while towing a trailer can be challenging for many drivers, particularly for drivers that drive with a trailer on an infrequent basis or with various types of trailers. Systems used to assist a driver with backing a trailer frequently estimate the position of the trailer relative to the vehicle with a sensor that determines a steering input for the vehicle based on an input trailer curvature path and determined a hitch angle. Both the hitch angle determination and the steering input determination require use of a kinematic model of the combined trailer and vehicle that includes both the length of the trailer, more particularly, from the point of attachment with the vehicle to the front axle thereof and an angle between the vehicle and the trailer at that point of attachment. While some systems have relied on user input for the trailer length, doing so may place an undesired burden on the user and may introduce inaccuracies that some such systems are unequipped to handle. The accuracy and reliability of the calculations involving trailer length can be critical to the operation of the backup assist system. Accuracy of the trailer-vehicle angle (also referred to as the "hitch angle") is similarly important in determining the kinematic relationship. Accordingly, improvements related to automated system estimation of trailer length and hitch angle in an accurate manner may be desired.

SUMMARY OF THE INVENTION

According to one aspect of the present disclosure, a backup assist system for a vehicle and trailer combination includes a steering system, a camera generating an image of the trailer, and a controller. The controller receives the image and identifying a wheel therein, determines a trailer hitch angle using at least one of an aspect ratio or location of the wheel in the image, and implements a trailer backup mode including using the estimated hitch angle in view of a kinematic model of the vehicle and trailer combination to control the steering system in reversing the trailer along a user-selected path.

According to another aspect of the present disclosure, a vehicle includes a steering system, a camera generating images of a predetermined area to a rear of the vehicle, and a system for assisting in reversing the vehicle with a trailer coupled therewith. The system includes a controller processing sequential images received from the camera to identify a wheel and determine at least one of an aspect ratio or position of a wheel therein, determining a trailer hitch angle using at least one of the aspect ratio or the position of the wheel in the sequential images, and implementing a trailer backup mode including using the estimated hitch angle in view of a kinematic model of the vehicle and trailer combination to control the steering system in reversing the trailer along a user-selected path.

According to another aspect of the present disclosure, a method for assisting a vehicle in reversing a trailer includes using a processor to identify a wheel and determine at least one of an aspect ratio or position of a wheel therein, determine a trailer hitch angle using at least one of the aspect ratio or the position of the wheel in the sequential images, and use the estimated hitch angle in view of a kinematic model of the vehicle and trailer combination to control a steering system of the vehicle in reversing the trailer along a user-selected path in a trailer backup mode.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
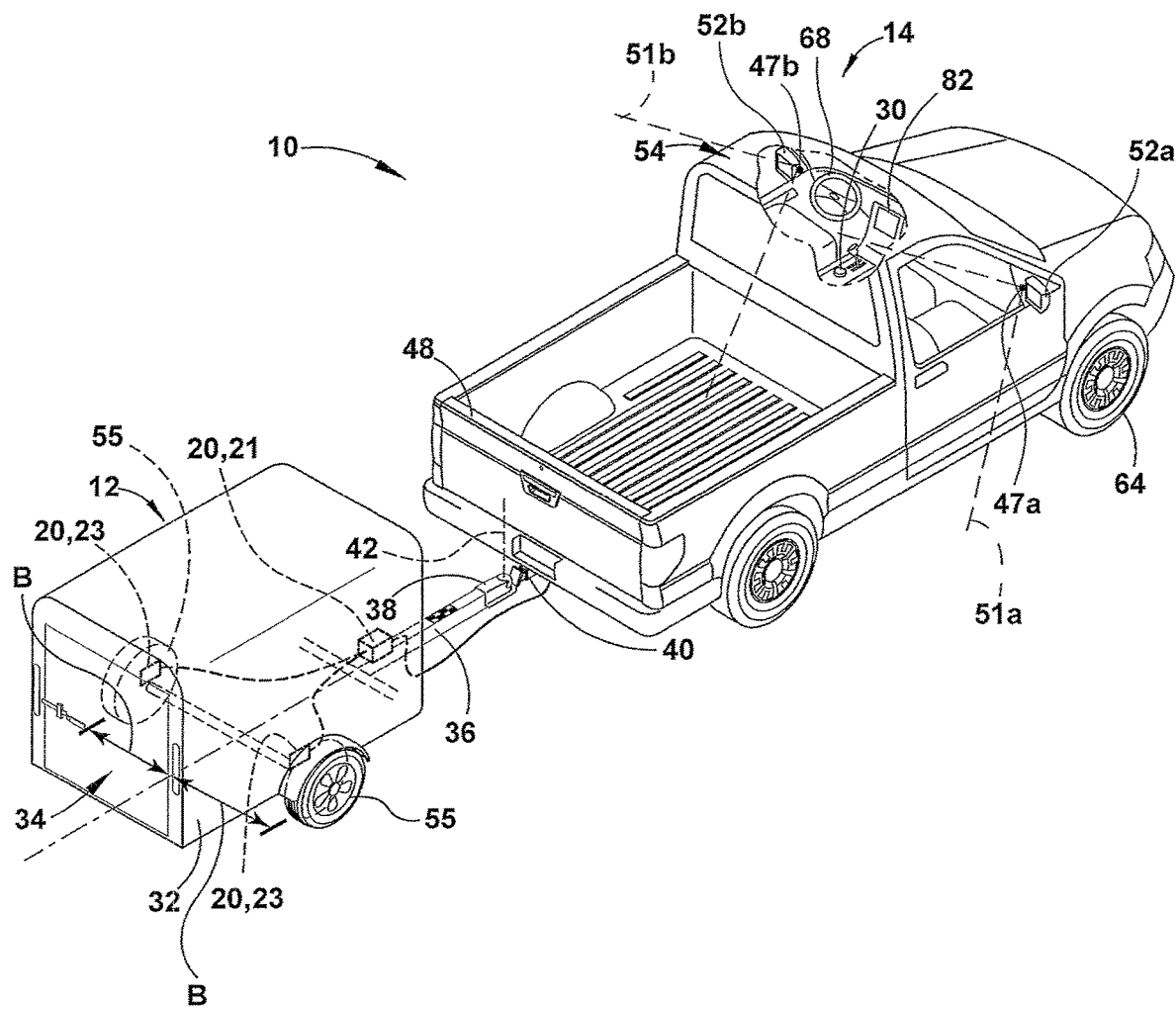
FIG. 1 is a top perspective view of a vehicle attached to a trailer with one embodiment of a hitch angle sensor for operating a trailer backup assist system.

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

Referring to FIGS. 1-19, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. To monitor the position of the trailer 12 relative to the vehicle 14, the trailer backup assist system 10 may include a sensor 44 that senses or otherwise determines a hitch angle γ between the trailer 12 and the vehicle 14. In one embodiment, the sensor 44 may operate with one or more rear view cameras 47a,47b of vehicle 14 (such cameras being potentially used in other systems included in vehicle 14) to obtain an image or sequential images of a one or more fields of view 51a,51b of the respective cameras 47a,47b, which may be carried out by, for example, controller 28 of system 10 (as shown in FIG. 2) or by a stand-alone processor within sensor 44. In this manner, the trailer angle "sensor" 44 may be a stand-alone device or may be discussed herein to refer to various components associated with vehicle 14 (that may be part of other vehicle systems or the like) that are used in monitoring the hitch angle γ. The image or images can be processed and analyzed to identify at least one of the wheels 55a,55b of trailer 12 and to determine an aspect ratio AR of the wheel 55a or 55b. As discussed further below, the aspect ratio AR can be used in determining, depending on the operation and other available information, one of the trailer length D and the hitch angle γ of the trailer 12 relative to the vehicle 14.

The controller 28 of the trailer backup assist system 10 may thereby determine a hitch angle γ based on the determined aspect ratio AR in view of a kinematic relationship between the trailer 12 and the vehicle 14 that may be dependent on include a value for the length D of the trailer 12. In a further aspect of such an embodiment, under predetermined conditions, trailer length D may first be determined using camera 47a and/or camera 47b, for example, in a similar manner to that which is used by sensor 44 in determining the hitch angle γ. As discussed further below, the predetermined conditions can be such that the trailer length D is obtained independent of γ such that the trailer length D can be determined prior to using system 10 in a trailer backing operation. Subsequently, the determined value for D can be used in view of the kinematic model and using sensor 44, as discussed below, to monitor the trailer hitch angle γ. In further embodiments, systems and methods for determining the trailer length D and the hitch angle γ can be implemented and used separately and independently from each other.

With reference to FIGS. 1-9, the general operation of the trailer backup assist system 10 is discussed. In particular, a steering input device 18 may be provided, such as a rotatable knob 30, for a driver to provide the desired curvature 26 of the trailer 12. As such, the steering input device 18 may be operable between a plurality of selections, such as successive rotated positions of a knob 30, that each provide an incremental change to the desired curvature 26 of the trailer 12. Upon inputting the desired curvature 26, the controller may generate a steering command for the vehicle 14 to guide the trailer 12 on the desired curvature 26 based on the estimated hitch angle γ and a kinematic relationship between the trailer 12 and the vehicle 14. Therefore, the accuracy of the hitch angle estimation, and accordingly, the trailer length estimation is important to operating the trailer backup assist system 10.

Figure 2:
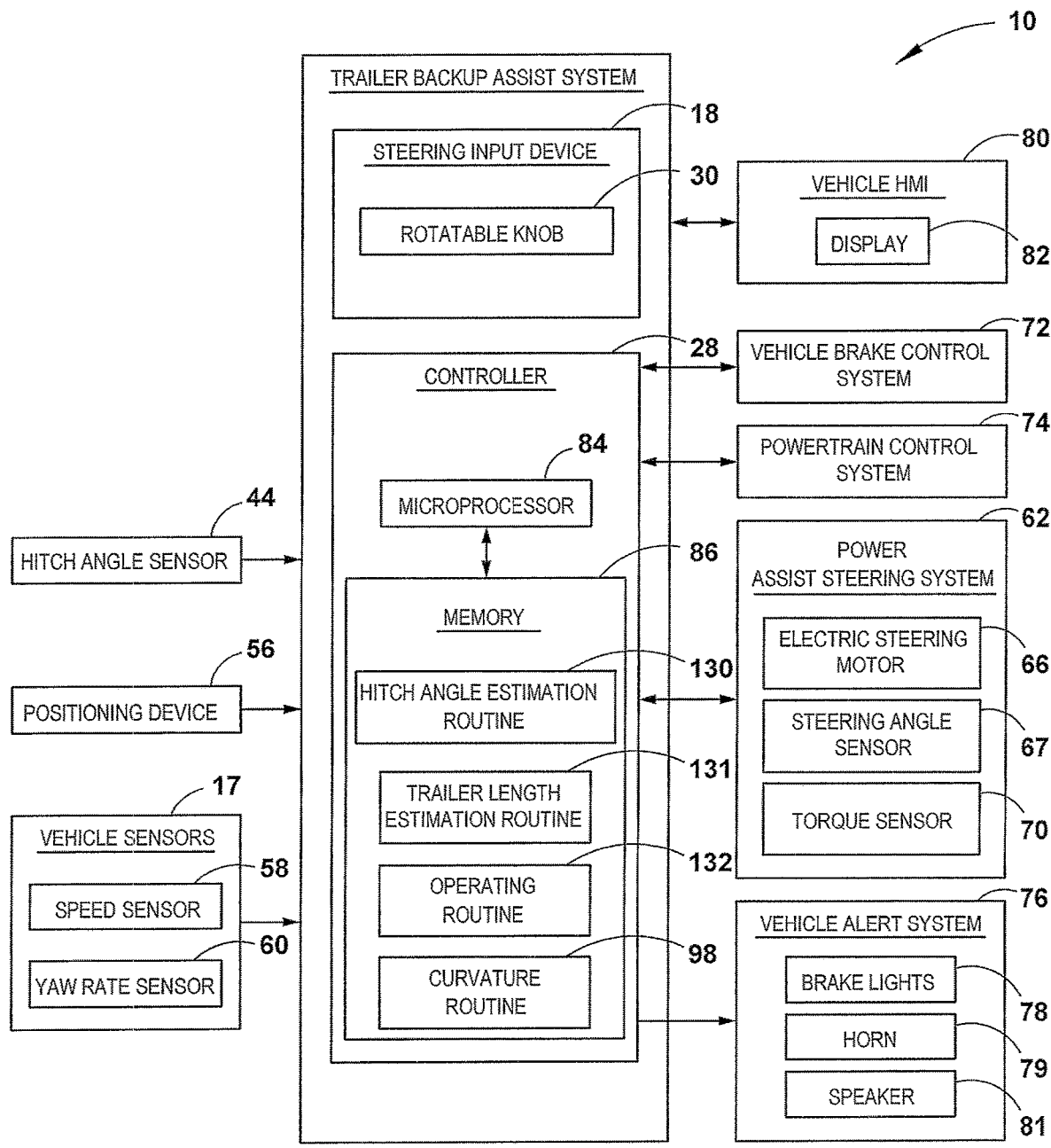
FIG. 2 is a block diagram illustrating one embodiment of the trailer backup assist system having a steering input device, a curvature controller, and a trailer braking system.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

As mentioned above, system 10 may also include a vision-based hitch angle sensor 44 for estimating the hitch angle γ between the vehicle 14 and the trailer 12. The illustrated hitch angle sensor 44 employs two cameras 47a,47b (e.g. video imaging cameras) that may be located along respective sides of vehicle 14 (such as the driver and passenger sides thereof) and may be positioned within respective side view mirror assemblies 52a,52b. Alternatively, a single camera located centrally, such as above a rear window or on tailgate 48, may be utilized. The depicted dual side camera arrangement, however, may be preferable, as the cameras 47a,47b are more likely to be able to capture respective wheels 55a,55b in their respective fields of view 51a,51b at low values of hitch angle γ. The illustrated cameras 47a,47b have respective imaging fields of view 51a,51b located and oriented to capture one or more images of the trailer 12, including a region containing the corresponding trailer wheel 55a,55b on the side of vehicle 14 corresponding to the respective camera 47a,47b. The illustrated cameras 47a,47b may include video imaging cameras that repeatedly capture successive images of the trailer 12 that may be processed to identify any one of wheels 55a,55b present within one of the fields of view 51a,51b and the wheel 55a or 55b location within the field of view 51a,51b. As mentioned above, such information can be used for determining movement of the trailer 12 relative to the vehicle 14 and the corresponding hitch angle γ or for determining the trailer length D, as discussed in greater detail below.

It should also be appreciated that the cameras 47a,47b may include one or more video imaging cameras and may be located at other locations on the vehicle 14 to acquire images of the trailer 12. Furthermore, it is contemplated that in an embodiment, only the below-described wheel aspect ratio based scheme for determining the trailer length D may be employed with additional embodiments of the hitch angle sensor 44 used for providing the hitch angle γ. Such embodiments may include one or a combination of a trailer-target based system, a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44 described herein.

The illustrated embodiment of the trailer backup assist system 10 receives vehicle and trailer status-related information from additional sensors and devices. This information includes positioning information from a positioning device 56, which may include a global positioning system (GPS) on the vehicle 14 or a handled device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 4 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, the hitch angle sensor 44 and other vehicle sensors and devices may provide sensor signals or other information, such as proximity sensor signals or successive images of the trailer 12, that the controller of the trailer backup assist system 10 may process with various routines to determine an indicator of the hitch angle γ, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18 according to one embodiment may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, a trailer length estimation routine 131, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
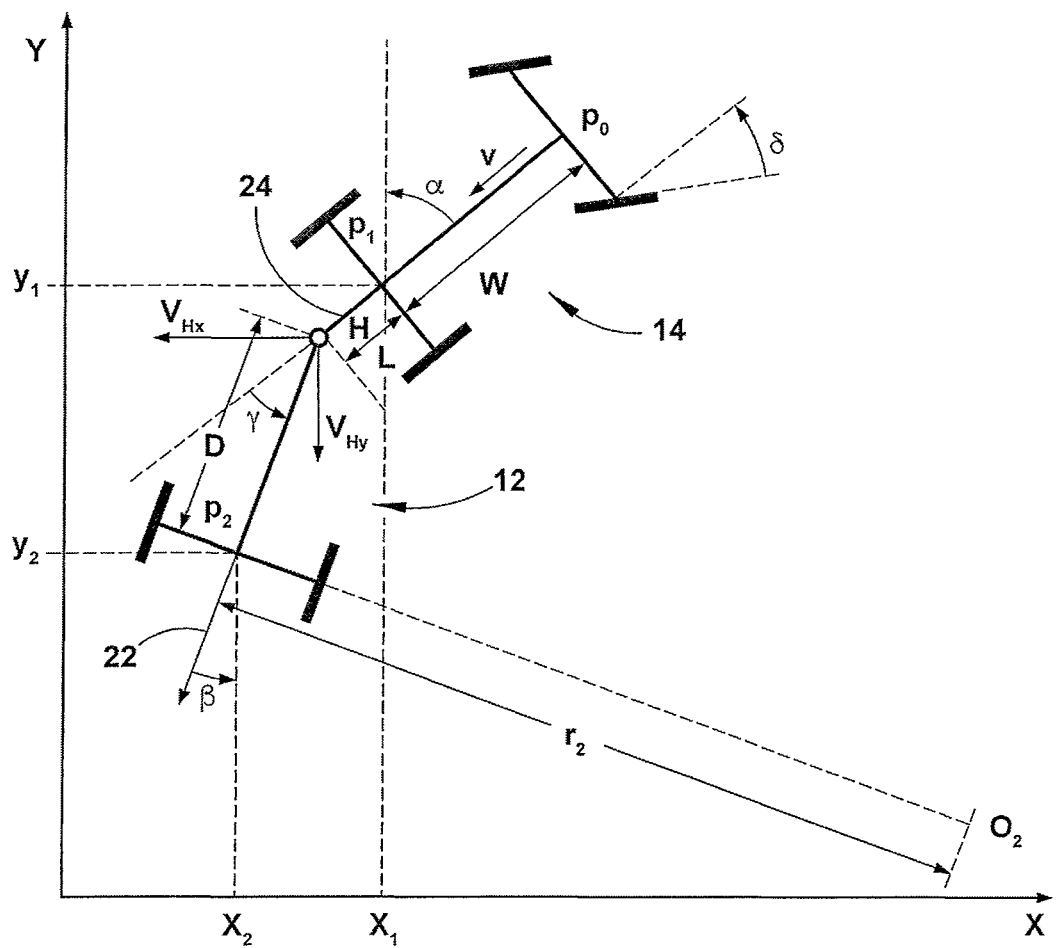
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

δ: steering angle at steered front wheels of the vehicle;
α: yaw angle of the vehicle;
β: yaw angle of the trailer;
γ: hitch angle (γ=β−α);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 4:
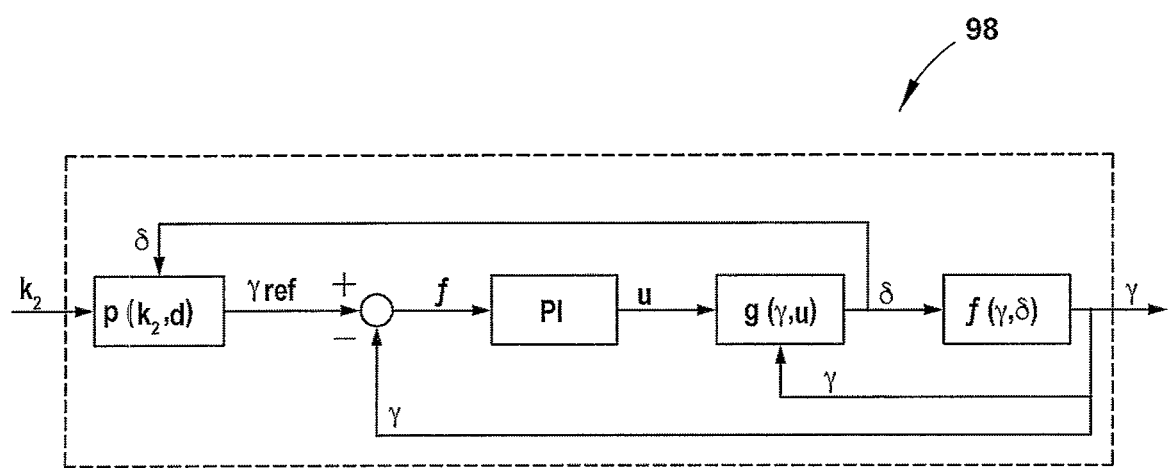
FIG. 4 is a schematic block diagram illustrating portions of a curvature controller, according to an additional embodiment, and other components of the trailer backup assist system, according to such an embodiment.

Yet another embodiment of the curvature routine 98 of the trailer backup assist system 10 is illustrated in FIG. 4, showing the general architectural layout whereby a measurement module 88, a hitch angle regulator 90, and a curvature regulator 92 are routines that may be stored in the memory 86 of the controller 28. In the illustrated layout, the steering input device 18 provides a desired curvature $\kappa_2$ value to the curvature regulator 92 of the controller 28, which may be determined from the desired backing path 26 that is input with the steering input device 18. The curvature regulator 92 computes a desired hitch angle γ(d) based on the current desired curvature $\kappa_2$ along with the steering angle δ provided by a measurement module 88 in this embodiment of the controller 28. The measurement module 88 may be a memory device separate from or integrated with the controller 28 that stores data from sensors of the trailer backup assist system 10, such as the hitch angle sensor 44, the vehicle speed sensor 58, the steering angle sensor 67, or alternatively the measurement module 88 may otherwise directly transmit data from the sensors without functioning as a memory device. Once the desired hitch angle γ(d) is computed by the curvature regulator 92 the hitch angle regulator 90 generates a steering angle command based on the computed desired hitch angle γ(d) as well as a measured or otherwise estimated hitch angle γ(m) and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Specifically, entering the control system is an input, $\kappa_2$, which represents the desired curvature 26 of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 D L \tan(\delta) - W}\right)$$

Where, $\kappa_2$ represents the desired curvature of the trailer 12 or $1/r_2$ as shown in FIG. 3;

$\delta$ represents the steering angle;

L represents the distance from the rear axle of the vehicle 14 to the hitch pivot point;

D represents the distance from the hitch pivot point to the axle of the trailer 12; and W represents the distance from the rear axle to the front axle of the vehicle 14.

The output hitch angle of $p(\kappa_2, \delta)$ is provided as the reference signal, $\gamma_{ref}$, for the remainder of the control system, although the steering angle $\delta$ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right)$$

The feedback control law, $g(u, \gamma, v)$, is implemented with a proportional integral (PI) controller, whereby the integral portion substantially eliminates steady-state tracking error. More specifically, the control system illustrated in FIG. 5 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\overline{\delta}$$

$$\tan(\delta) = \overline{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle $\gamma(d)$ to reach or exceed a jackknife angle $\gamma(j)$, as computed by the controller 28 or otherwise determined by the trailer backup assist system 10, as disclosed in greater detail herein.

As can be appreciated based on the foregoing, there are various ones of the kinematic parameters in the curvature $\kappa_2$ and steering input $\delta$ equations that are generally fixed and correspond to the dimensions of the vehicle 14 and trailer 12 combination. Specifically, the length D of the trailer 12, the wheel base W of the vehicle 14, and the distance L from the hitch connection H to the rear axle of the vehicle 14 are generally fixed and may be stored in the memory 86 of system 10 (FIG. 2), whereas other kinematic parameters may be dynamic and obtained from trailer sensor module 20 and vehicle sensors 17 on an ongoing basis. It is noted that the wheel base of the vehicle 14 and the distance from the hitch connection to the rear axle of the vehicle 14 relate only to vehicle 14 itself, within which the controller 28 and, accordingly, memory 86, are installed. It follows, then, these parameters may be stored in memory 86 during manufacture of vehicle 14, or during installation of the relevant portions of system 10 therein, as they are known in relation to the specific make and model of the particular vehicle 14. On the other hand, the length D of the trailer 12, while fixed with respect to a particular initiated operating routine 132, may vary as different trailers 12 are hitched to vehicle 14 for towing thereby. Further, the particular trailer 12 with which a given vehicle 14 will be used may not be known during manufacture of vehicle 14 or installation of system 10, and a user of such a vehicle 14 may wish to use vehicle 14 in various operating routines 132 with various trailers 12 of different sizes and configurations. Accordingly, a routine 131 for system 10 obtaining the particular trailer length D of a trailer hitched with vehicle 14 may be used prior to system 10 implementing operating routine 132. In some embodiments, system 10 may be able to determine if the trailer 12 currently coupled with vehicle 14 is the same as one previously coupled with vehicle 14 during a prior implementation of backup routine 132, in which case, system 10 may use a prior-determined value for the trailer length D. Still further, system 10 may, in some embodiments be able to store a determined trailer length D in a data entry in memory 86 associated with the particular trailer 12 for which the length D has been determined. In this manner, a user, upon switching trailers 12, may be able to select the particular trailer 12 from a list of trailers with an already-determined length D associated therewith or may select an option to run estimation routine 131 for a new trailer 12.

Figure 5:
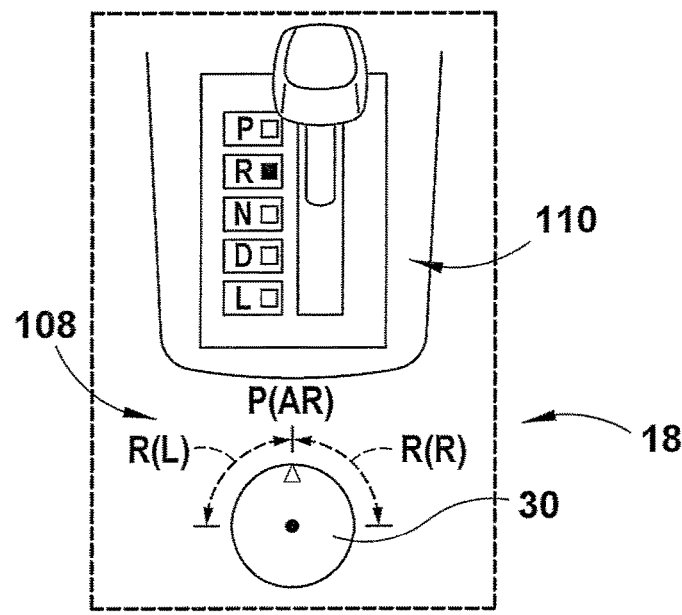
FIG. 5 is a plan view of a steering input device having a rotatable knob for operating the trailer backup assist system, according to one embodiment.

Referring now to FIG. 5, one embodiment of the steering input device 18 is illustrated disposed on a center console 108 of the vehicle 14 proximate a shifter 110. In this embodiment, the steering input device 18 includes a rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 6:
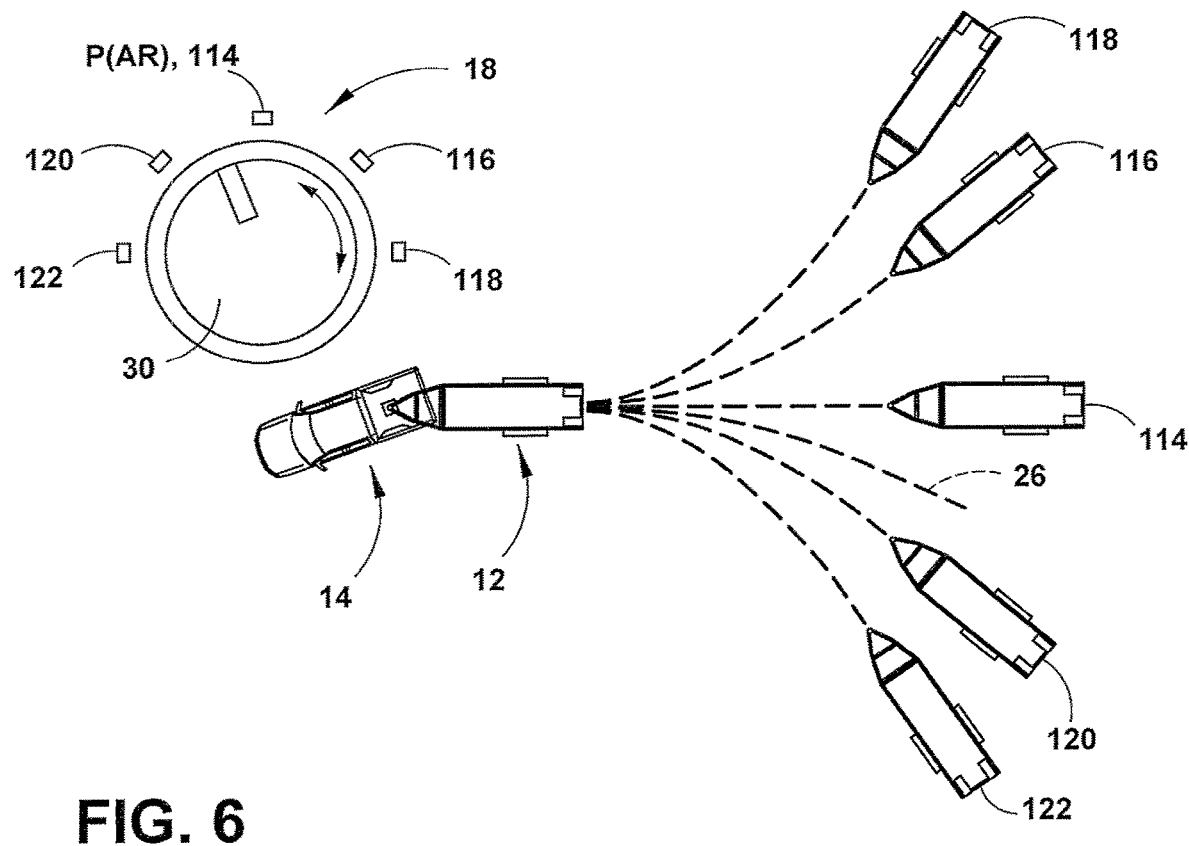
FIG. 6 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIG. 6, may be biased (e.g., by a spring return) to a center, or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). In this manner, the input device 18 can provide a signal to controller 28 that includes both a direction (corresponding to the range, R(L) or R(R), in which knob 30 is turned) and an amplitude according to how far within that range knob 30 is turned. Accordingly, controller 28 can interpret the signal from input device 18 as a curvature input in the direction indicated by the signal. To provide a tactile indication of an amount of rotation of the rotatable knob 30, a torque that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR), which itself may correspond to a zero-curvature command. It is also contemplated that the rate of rotation of the rotatable knob 30 may also be used to determine the desired curvature 26 output to the controller 28. The at-rest position P(AR) of the knob corresponds to a signal indicating that the vehicle 14 should be steered such that the trailer 12 is backed along a substantially straight backing path 114 (FIG. 6) zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 6, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position.

Figure 7:
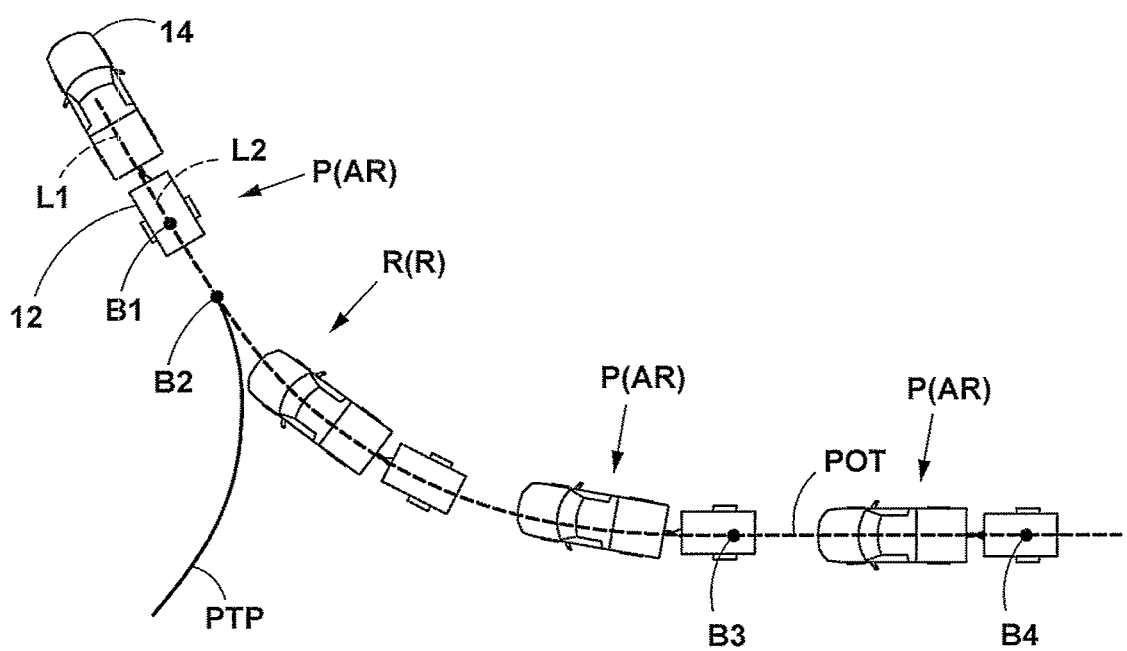
FIG. 7 is a schematic diagram showing a backup sequence of a vehicle and a trailer implementing various curvature selections with the trailer backup assist system, according to one embodiment.

Referring to FIG. 7, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob 30 with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob 30 is in/returned to the at-rest position P(AR).

In the embodiment illustrated in FIG. 7, in order to activate the trailer backup assist system 10, the driver interacts with the trailer backup assist system 10 and the automatically steers as the driver reverses the vehicle 14. As discussed above, the driver may command the trailer backing path by using a steering input device 18 and the controller 28 may determine the vehicle steering angle to achieve the desired curvature 26, whereby the driver controls the throttle and brake while the trailer backup assist system 10 controls the steering.

Figure 8:
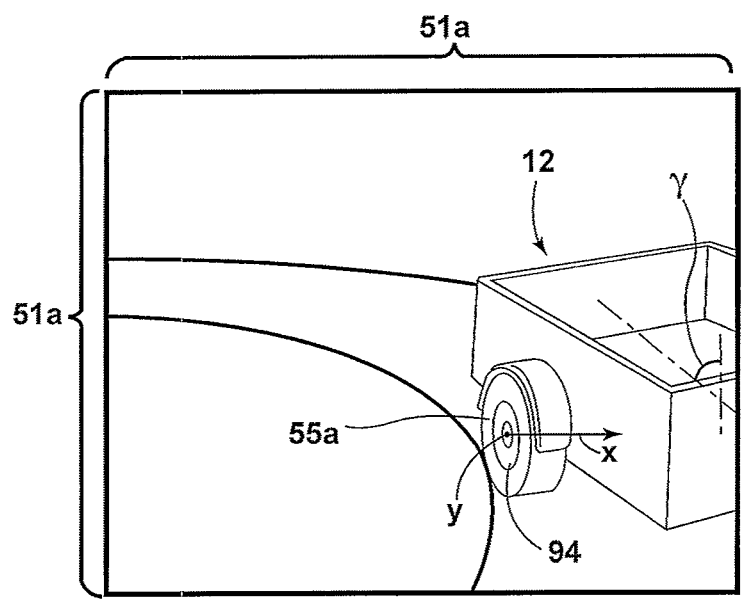
FIG. 8 is an example of an image received from a camera including a trailer and wheel thereof that can be processed according to an aspect of the disclosure to determine a characteristic of the vehicle-trailer combination.
Figure 9:
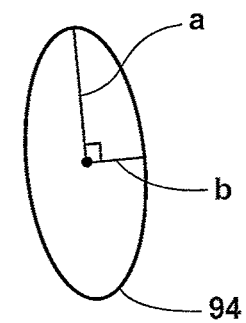
FIG. 9 is a schematic view of a projected ellipse derived from the image of FIG. 8 during processing thereof.
Figure 10:
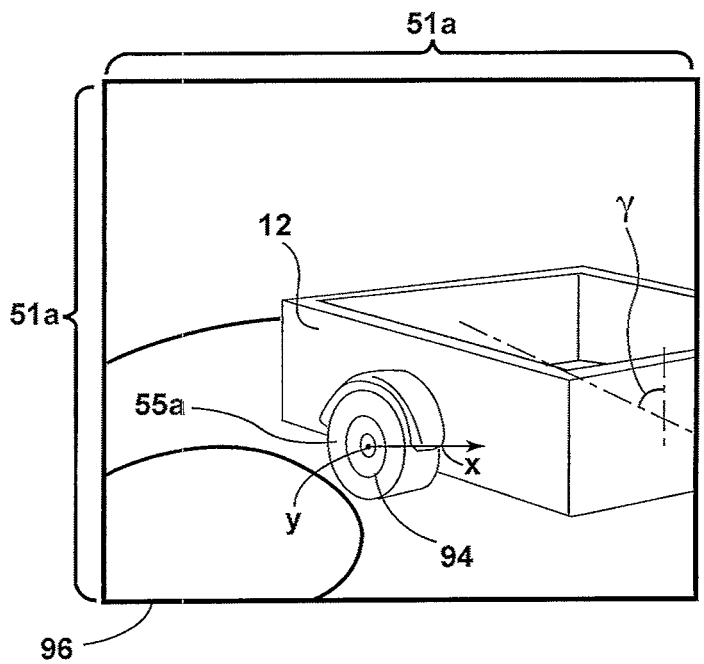
FIG. 10 is another example an image received from the camera including the trailer and wheel thereof that can be processed according to an aspect of the disclosure to determine the characteristic of the vehicle-trailer combination.

Turning now to FIGS. 8-13 and as discussed above, controller 28 can implement a trailer length estimation routine 131 as-needed to determine the trailer length D. In various examples described herein, this can be done separately from and prior to a hitch angle estimation routine 130. In particular, trailer length estimation routine 131 may utilize known characteristics of vehicle 14 in combination with determined characteristics of the image of one of trailer wheels 55a or 55b within the field of view 51a or 51b of one of cameras 47a or 47b to estimate the length D of trailer 12. In particular, as illustrated in FIGS. 8-11, the view angle of camera 47a relative to wheel 55a causes distortion of the image of wheel 55a. In particular, wheel 55a will appear as an ellipse 94 within the associated image 96 (FIGS. 8 and 10). In general, and depending on the particular locations and characteristics of cameras 47a, 47b wheels 55a and 55b will appear as very narrow ellipses or straight lines (if they are viewable at all) when the hitch angle γ is zero or close to zero, and will, eventually, appear as circles (i.e. a special case of an ellipse wherein both axes are equal) when the particular wheel 55a or 55b is facing the corresponding camera 47a or 47b. In general, controller 28 can be calibrated to recognize when both cameras 47a and 47b fail to show an image of a wheel 55a, 55b to indicate a zero hitch angle γ. Further, an instance when a wheel 55a or 55b faces camera 47a or 47b, it would necessarily correspond to a hitch angle above 90°, which in most cases wherein a fifth-wheel arrangement is not used, is not possible during a backing operation (particularly, when jackknife mitigation controls are present) and would not correspond with, for example, a maximum steering input $\delta_{max}$ during a forward driving operation.

Figure 11:
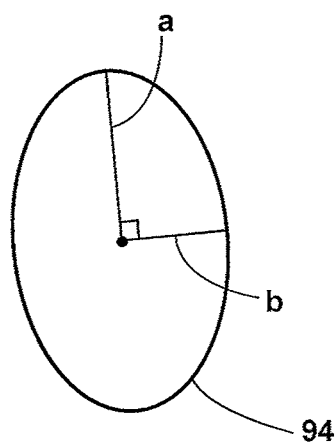
FIG. 11 is a schematic view of a projected ellipse derived from the image of FIG. 8 during processing thereof.

As can be seen in FIGS. 8 and 10, the particular characteristics of the ellipse 94 present in image 96 by the projection of wheel 55a changes with varying positions of trailer 12 with respect to vehicle 14 and, accordingly, within image 96. In particular, as shown in FIGS. 9 and 11, an aspect ratio AR of the ellipse 94 changes with hitch angle γ. As illustrated, the aspect ratio AR of ellipse 94 is characterized as the ratio of the minor axis b to its major axis a. In this manner, an ellipse 94 present in image 96 by the projection of wheel 55a when trailer 12 will increase in aspect ratio (i.e. increases to 1) as the hitch angle γ increases. For example, in the illustrated image 96 of FIG. 8, a lower aspect ratio AR of ellipse 94 is present by the minor axis b appearing shorter than in the image 96 of FIG. 10. As can further be seen, the smaller aspect ratio AR corresponds with a smaller hitch angle γ in the image 96 of FIG. 8. In this manner, controller 28 can utilize an image processing algorithm to detect the location of the trailer wheel 55a or 55b. By way of example, an algorithm may locate a wheel 55a or 55b by searching for a pattern of a tire and wheel and/or by searching for pixels that rotate about an axis in a quasi-steady state turn. Once identified, the ellipse 94 corresponding to wheel 55a or 55b can be analyzed to derive its aspect ratio. The ellipse 94 can be derived from either the wheel itself or the tire, as the aspect ratio thereof would be the same. Using the wheel may be more accurate, as it is not distorted by the weight of the trailer 12 on the ground.

Figure 12:
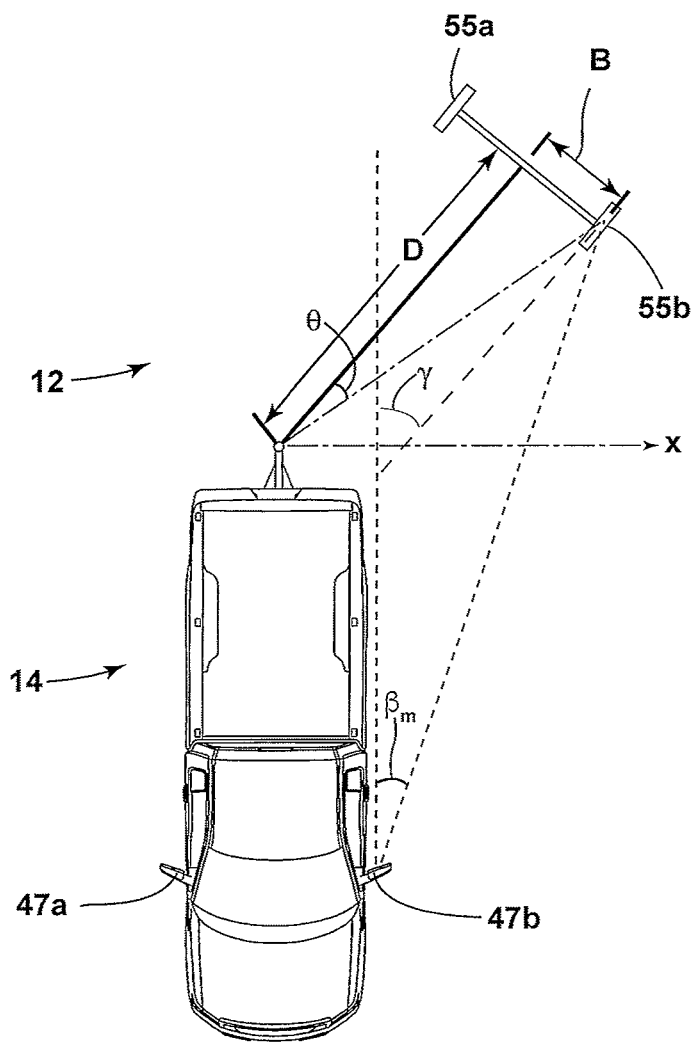
FIG. 12 is a schematic view showing the relationship between the image of the vehicle wheel and a length of the trailer.
Figure 13:
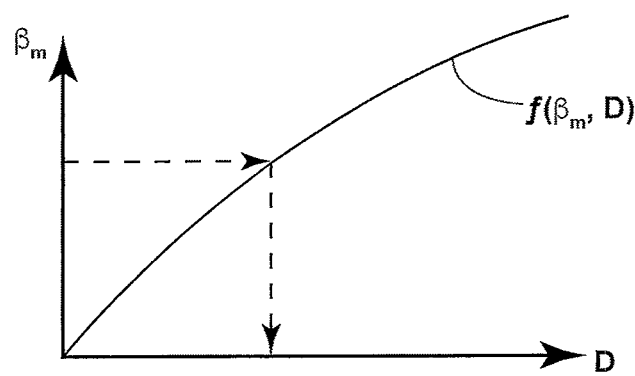
FIG. 13 is a graphical representation between a view angle of the wheel in the image received from the camera and a length of the trailer.

As shown in FIGS. 12 and 13, this difference in aspect ratio AR of ellipses 94 present in images 96 by the projection of wheel 55a (or wheel 55b in the case of the other camera 47b) can be used to determine the length D of trailer. Using the geometric relationship in FIG. 12, where:

$\gamma_m$: maximum trailer angle in forward drive;

θ: offset angle of wheel 55a,55b relative to trailer 12 tongue 36;

$\beta_m$: maximum view angle of wheel 55a,55b relative to lateral location of camera 47a,47b;

β: instantaneous view angle of wheel 55a,55b;

$x_m$, $y_m$: coordinates of wheel 55a,55b when trailer 12 angle is max $\gamma_m$ in forward drive;

D: trailer 12 length;

B: half of track of trailer 12;

W: wheel base of vehicle;

L: distance from hitch pivot to vehicle rear axle;

$\delta_m$: maximum steering angle; and

δ: steering angle, a mapping relationship between maximum view angle $\beta_m$ of wheel 55a,55b and trailer length D can be established. In particular, according to trailer tow kinematic model, described above with respect to FIG. 3, the maximum trailer angle in forward drive $\gamma_m$ is determined by:

$$\cos\gamma_m = \frac{-LD\tan^{-2}(\delta_m) \pm W\sqrt{W^2 + (L^2 - D^2)\tan^2(\delta_m)}}{L^2\tan^2(\delta_m) + W^2}.$$

A wheel offset angle α relative to the trailer frame can be expressed as:

$$\theta = \tan^{-1}\frac{B}{D}.$$

Further, the coordinates or the wheel 55a or 55b relative to the location of camera 47a or 47b, when trailer 12 reaches the maximum hitch angle $\gamma_m$ are:

$$x_m = \sqrt[4]{B^2+D^2} \cdot \sin(\theta+\gamma_m) \text{ and}$$

$$y_m = \sqrt[4]{B^2+D^2} \cdot \cos(\theta+\gamma_m).$$

Still further, the view angle $\beta_m$, i.e. the angle defined by a line from camera 47a to wheel 55a relative to the center of camera 47a parallel to the y-axis in FIG. 12, when at the maximum hitch angle $\gamma_m$ is:

$$\beta_m = \tan^{-1}\left(\frac{x_m - B}{y_m + D}\right).$$

Combining the above equations, it is seen that the maximum view angle $\beta_m$ is a function of a number of constants, including the unknown trailer length D. Specifically:

$$\beta_m = f(L, W, \delta_m, B, D).$$

Figure 14:
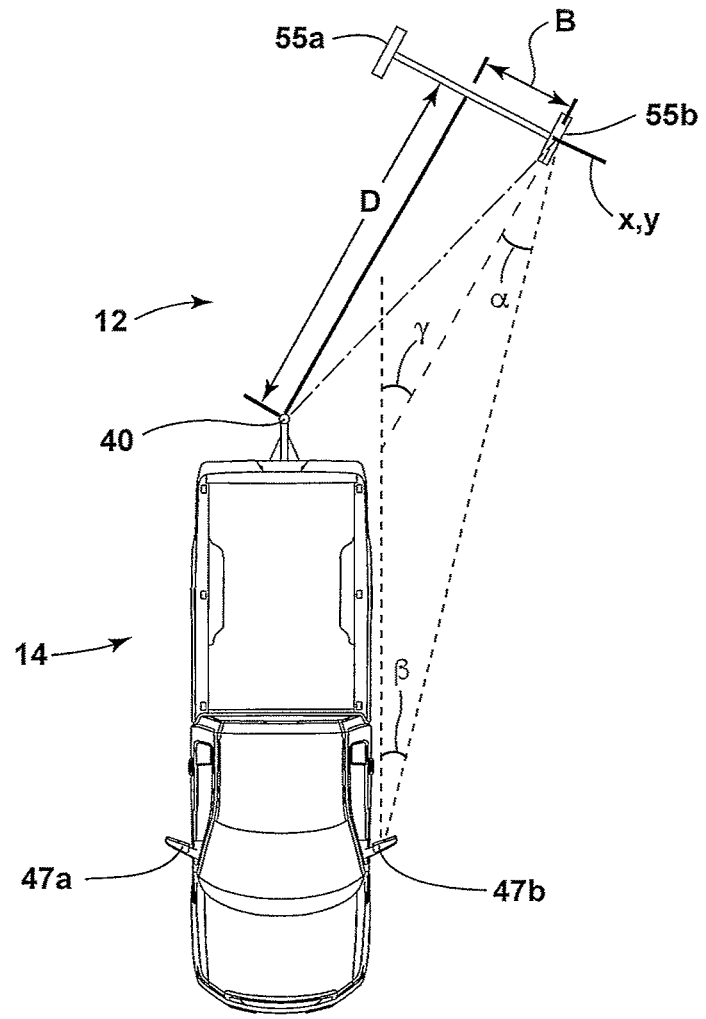
FIG. 14 is a schematic view showing the relationship between the image of the vehicle wheel and an angle of the trailer relative to the vehicle.

Accordingly, the maximum view angle $\beta_m$ can simply be expressed as a function of trailer length D, as represented in FIG. 14.

In an embodiment, $\beta_m$ can be determined by the above-described ellipse 94 identification. In particular, the location of the cameras 47a,47b (at least in the lateral direction corresponding to the x-axis in FIG. 12) are fixed and, accordingly can be stored in memory 86. Further, the characteristics of cameras 47a and 47b are known and can be used in an algorithm such that by locating ellipse 94 within image 96, the $x_m$ coordinate of ellipse 94 (such as the center of ellipse 94, which can be identified when determining the aspect ratio AR thereof in the same algorithm) can be determined by controller 28 in processing image 96. Further, the aspect ratio AR of ellipse 94 can be used to determine the angle of wheel 55a or 55b, which is shown to be the same as hitch angle λ. Accordingly, as discussed above, an aspect ratio approaching zero (or failure to locate ellipse 94 by both cameras 47a and 47b) can indicate a zero hitch angle γ, an aspect ratio of one can indicate a hitch angle γ of 90°, and aspect ratios AR therebetween can be interpolated to correspond to particular values for hitch angle γ between zero and 90. As shown in FIG. 12, using the aspect ratio of wheels 55a or 55b and the $x_m$ value, controller 28 can determine the maximum view angle $\beta_m$ (as well as $y_m$, if needed). Alternatively, $\beta_m$ can be determined using further image processing that takes into account the focal length of camera 47a or 47b. In such a process, controller 28 can instruct camera 47a or 47b to focus on wheel 55a or 55b, as identified using initial-stage image processing, controller 28 receiving an input regarding the focal length of camera 47a or 47b when focusing has been achieved. Alternatively, image processing can take into account blur in the image to interpolate distance based on constant focal length information received from camera 47a or 47b. The focal length information can then be used to determine both $x_m$ and $y_m$, which can be used to determine the maximum view angle $\beta_m$ directly without identifying the aspect ratio AR for ellipse 94.

When the maximum view angle $\beta_m$ is determined, a lookup table stored in memory 86 (such as during vehicle manufacture or system 10 installation) can be referenced to correlate the given $\beta_m$ with the value for trailer length D. As illustrated in FIG. 13, when trailer length estimation routine 131 uses a maximum steering angle $\delta_m$, a two-dimensional lookup table can be used. In such an embodiment, controller 28 can instruct a driver of vehicle 14 (such as by HMI 80) to drive forward at the maximum steering angle $\delta_m$ in either direction (left or right). When the steering angle $\delta$ is detected to be at the maximum steering angle $\delta_m$, and trailer 12 is in a steady state position within image 96 (indicating that the hitch angle $\gamma$ is at the maximum in a steady state condition), controller 28 can run the trailer length estimation routine 131 including measuring the view angle $\beta$, which can under such conditions be interpreted as the maximum view angle $\beta_m$, and looking up the corresponding trailer length D in the lookup table.

In an alternative embodiment, the user can select a desired steering angle $\delta$ (i.e. above a predetermined range but, potentially, less than the maximum). The view angle $\beta$ can then be expressed as a function of trailer length D and steering angle $\delta$, with a three dimensional lookup table being referenced to determine the trailer length D using the measured view angle $\beta$ corresponding with a measured steady-state steering angle $\delta$. In such an embodiment, controller 28 can simply instruct the driver of vehicle 14 to hold a turn (with instructions to increase if below a predetermined minimum) until controller 28 observes a steady-state steering angle $\delta$ and position of trailer 12 in image 96. At such a point, the view angle $\beta$ can be determined using either of the above schemes and the trailer length D can be determined by the corresponding value in the three-dimensional lookup table using the view angle $\beta$ and the steering angle $\alpha$ as inputs.

When the trailer length D has been determined, it can be stored as a value in memory 86 and used in subsequent backing operations using curvature routine 98. In various embodiments, the trailer length D can be associated in memory 86 with a particular trailer 12 based on various identifying characteristics. Accordingly, the particular length D of a trailer 12 can be recalled if such trailer 12 is subsequently disconnected and reconnected with vehicle 14.

Figure 15:
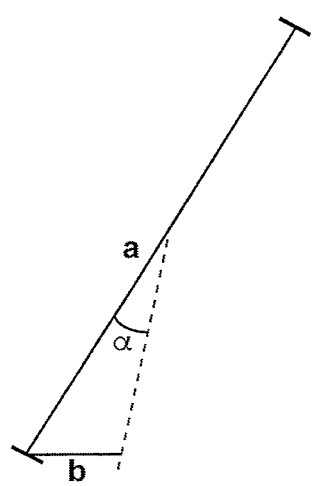
FIG. 15 is a detail view of a portion of the schematic view of FIG. 15.
Figure 16:
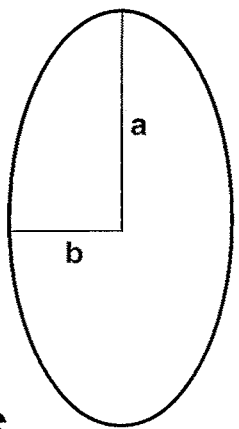
FIG. 16 is a further illustration showing an aspect ratio or an example ellipse derived from processing an image of the trailer wheel received from the cameral.

With continued reference to FIGS. 8-11 and with additional reference to FIGS. 14-16, the aspect ratio AR of an ellipse 94 corresponding to the projection of an identified wheel 55a or 55b in image 96 from camera 47a or 47b can also be used to determine the hitch angle $\gamma$ during a backing operation using curvature routine 98. Again, as discussed above, when the hitch angle $\gamma$ is zero, the trailer is straight and the wheel looks like a straight line section with an aspect ratio AR zero. As the hitch angle $\gamma$ increases, the line section grows to an ellipse shape, and the aspect ratio AR of ellipse 94 increases up to 1. Given the aspect ratio AR of ellipse 94 determined during processing of the image 96 of either camera 47a or 47b, the projection angle $\alpha$ (FIG. 14) can be determined. Further, as discussed above given the position of ellipse 94 in image 96 (again, with the position of cameras 47a and 47b known with respect to, for example, coupling 40), the view angle $\beta$ can be determined. In one example, the view angle $\beta$ can be described according to the processes discussed above. Alternatively, since the trailer length D is known (having been derived using the image of wheels 55a,55b or otherwise) when controller 28 executes a backing maneuver using curvature routine 98, the view angle $\beta$ can be determined geometrically using the position of ellipse 94 in image 96, particularly, the x-coordinate thereof. Knowing both the projection angle $\alpha$ and the view angle $\beta$, controller 28 can determine the trailer angle $\gamma$ as the sum of projection angle $\alpha$ and view angle $\beta$, as shown in FIG. 14.

Figure 17:
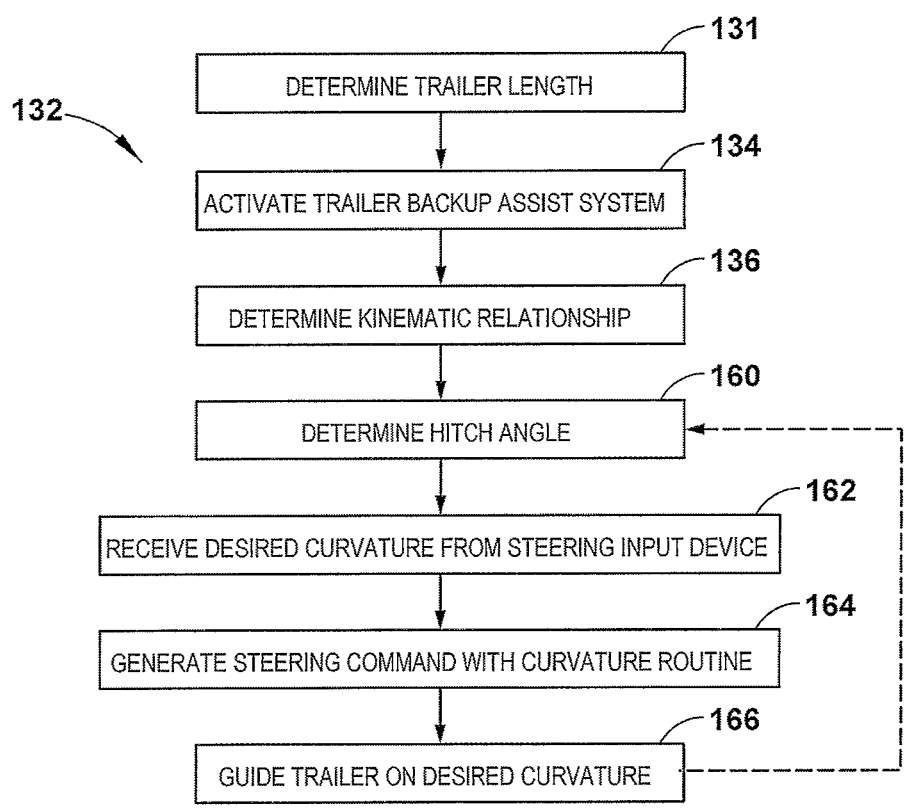
FIG. 17 is a flow diagram illustrating a method of operating a trailer backup assist system using an operating routine for steering a vehicle reversing a trailer with normalized control of the desired curvature, according to one embodiment.

With reference to FIG. 17, a method of operating one embodiment of the trailer backup assist system 10 is illustrated, shown as one embodiment of the operating routine 132 (FIG. 2). In one aspect, system 10 can be configured to lock out or deactivate operating routine 132 until a trailer length D estimate has been obtained in step 160 (discussed further above with reference to FIGS. 8-13). At step 134, the method is initiated by the trailer backup assist system 10 being activated. It is contemplated that this may be done in a variety of ways, such a making a selection on the display 82 of the vehicle HMI 80. The next step 136, then determines the kinematic relationship between the attached trailer 12 and the vehicle 14. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path 26 of the trailer 12. As discussed above, the kinematic parameters to define the kinematic relationship include a length D of the trailer 12, a wheel base W of the vehicle 14, a distance L from a hitch connection to a rear axle of the vehicle 14, and a hitch angle $\gamma$ between the vehicle 14 and the trailer 12, among other variables and parameters as previously described.

In one aspect, after the kinematic relationship is determined, the trailer backup assist system 10 may proceed at step 160 to determine the current hitch angle by processing the hitch angle estimation routine 130, as discussed above with respect to FIGS. 8, 9, and 14-16. At step 162 the position and rate of change is received from the steering input device 18, such as the angular position and rate of rotation of the rotatable knob 30, for determining the desired curvature 26. At step 164, steering commands may be generated based on the desired curvature, correlating with the position and rate of change of the steering input device 18. The steering commands and actuation commands generated may be generated in conjunction with processing of the curvature routine 98, as previous discussed. At step 166, the steering commands and actuation commands have been executed to guide the trailer 12 on the desired curvature provided by the steering input device 18. As shown, steps 160-166 can be iterated, continuously so long as the backup assist system 10 remains active.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A backup assist system for a vehicle and trailer combination, comprising:
    a steering system;
    a camera generating sequential images of the trailer; and
    a controller:
        continuously receiving and identifying a wheel in the sequential images and identifying a wheel therein;
        continuously determining an instantaneous trailer hitch angle using at least one of an aspect ratio or location of the wheel in a most recent one of the sequential images; and
        implementing a trailer backup mode including using the instantaneous hitch angle in view of a kinematic model of the vehicle and trailer combination to control the steering system in reversing the trailer along a user-selected path.

2. The system of claim 1, further including a curvature input device outputting a first curvature signal, wherein:
    the user-selected path is a backing path having a curvature according to the first curvature signal.

3. The system of claim 1, wherein the camera is positioned on a side of the vehicle and the wheel is a trailer wheel on a side of the trailer corresponding to the side of the vehicle.

4. The system of claim 1, wherein the controller further determines a length of the trailer using at least one of an aspect ratio or location of the wheel in at least one of the sequential images.

5. The system of claim 4, wherein the length of the trailer is determined by correlating a wheel view angle derived using the location of the wheel within the at least one of the images with a selection of trailer length values in a lookup table.

6. The system of claim 5, wherein the wheel view angle is a maximum wheel view angle derived from a selected one of the images received during a maximum steering angle vehicle condition.

7. The system of claim 1, wherein the trailer hitch angle is determined as a sum of:
    a projection angle of the wheel calculated using the aspect ratio of the wheel; and
    a view angle of the wheel relative to the camera derived from the location of the wheel within the image.

8. The system of claim 1, wherein the instantaneous trailer hitch angle is continuously updated from the most recent one of the sequential images of the trailer at least during control of the system in the trailer backup mode.

9. A vehicle, comprising:
    a steering system;
    a camera generating sequential images of a predetermined area to a rear of the vehicle; and
    a system for assisting in reversing the vehicle with a trailer coupled therewith and including a controller:
        continuously processing the sequential images received from the camera to identify a wheel and determine at least one of an aspect ratio or position of a wheel, when present in the sequential images;
        continuously determining an instantaneous trailer hitch angle using at least one of the aspect ratio or the position of the wheel in the sequential images; and
        implementing a trailer backup mode including using the instantaneous hitch angle in view of a kinematic model of the vehicle and trailer combination to control the steering system in reversing the trailer along a user-selected path.

10. The vehicle of claim 9, further including a curvature input device outputting a first curvature signal, wherein:
    the user-selected path is a backing path having a curvature according to the first curvature signal.

11. The vehicle of claim 9, wherein the controller further determines a length of the trailer using at least one of an aspect ratio or location of the wheel in at least one of the sequential images.

12. The vehicle of claim 11, wherein the length of the trailer is determined:
    using a selected one of the sequential images; and
    by correlating a determined wheel view angle determined using the position of the wheel within the image with a selection of trailer length values in a lookup table.

13. The vehicle of claim 12, wherein:
    the selected one of the images corresponds with a maximum steering angle vehicle condition; and
    the wheel view angle is interpreted as a maximum wheel view angle.

14. The vehicle of claim 13, wherein the trailer hitch angle is determined as a sum of:
    a projection angle of the wheel calculated using the aspect ratio of the wheel; and
    a view angle of the wheel relative to the camera derived from the location of the wheel within the predetermined area.

15. The vehicle of claim 9, wherein the instantaneous trailer hitch angle is continuously determined from the sequential images of the trailer during control of the system in the trailer backup mode.

16. A method for assisting a vehicle in reversing a trailer, comprising:

using a processor to:
- identify a wheel and determine at least one of an aspect ratio or position of a wheel in sequential images received from a camera;
- continuously determine an instantaneous trailer hitch angle using at least one of the aspect ratio or the position of the wheel in a most recent one of the sequential images; and
- use the instantaneous hitch angle in view of a kinematic model of the vehicle and trailer combination to control a steering system of the vehicle in reversing the trailer along a user-selected path in a trailer backup mode.

17. The method of claim 16, further including using the controller to receive a first curvature signal, wherein:
the user-selected path is a backing path having a curvature according to the first curvature signal.

18. The method of claim 16, further including determining a length of the trailer by correlating a wheel view angle derived using the position of the wheel within a selected one of the sequential images with a selection of trailer length values in a lookup table.

19. The method of claim 18, wherein the wheel view angle is a maximum wheel view angle derived from an image received during a maximum steering angle vehicle condition.

20. The method of claim 16, wherein:
the trailer hitch angle and is determined as a sum of:
- a projection angle of the wheel calculated using the aspect ratio of the wheel; and
- a view angle of the wheel relative to the camera derived from the position of the wheel within the image; and
wherein the trailer hitch angle is continuously determined from the sequential images of the trailer during control of the steering system in the trailer backup mode.

* * * * *